R. ROBERTS.
Dumping-Car.

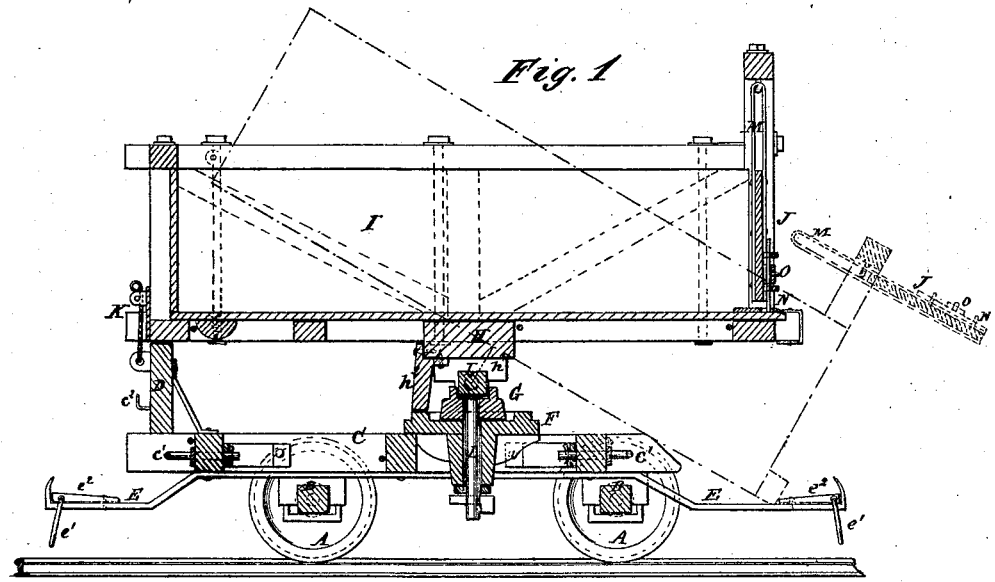
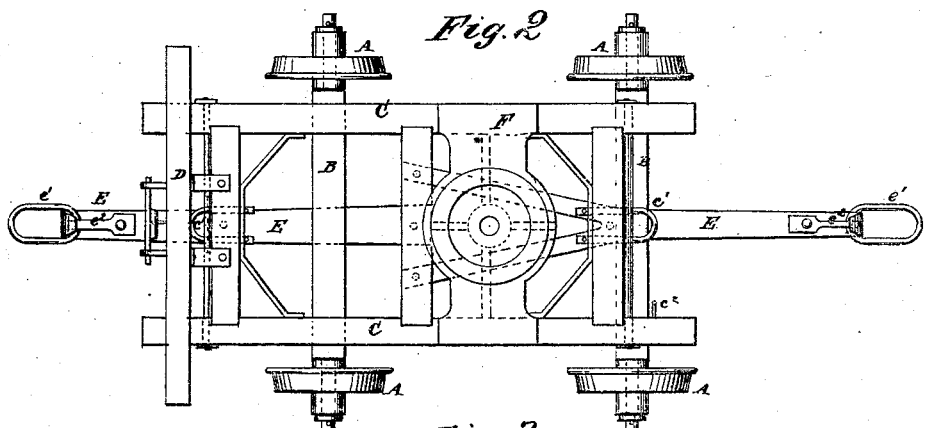
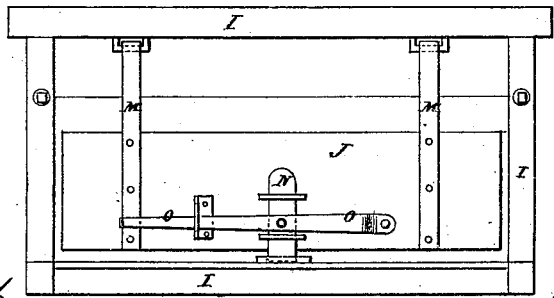

No. 160,122.

2 Sheets--Sheet 2.

Patented Feb. 23, 1875.

WITNESSES:
A. W. Almqvist
O. Sedgwick

INVENTOR:
R. Roberts
BY
ATTORNEYS.

THE GRAPHIC CO. PHOTO-LITH. 39 & 41 PARK PLACE, N.Y.

UNITED STATES PATENT OFFICE.

ROBERT ROBERTS, OF PATTENBURG, ASSIGNOR OF ONE-HALF HIS RIGHT TO NATHAN S. WYCKOFF, OF CLINTON, NEW JERSEY.

IMPROVEMENT IN DUMPING-CARS.

Specification forming part of Letters Patent No. 160,122, dated February 23, 1875; application filed May 29, 1874.

*To all whom it may concern:*

Figure 4:
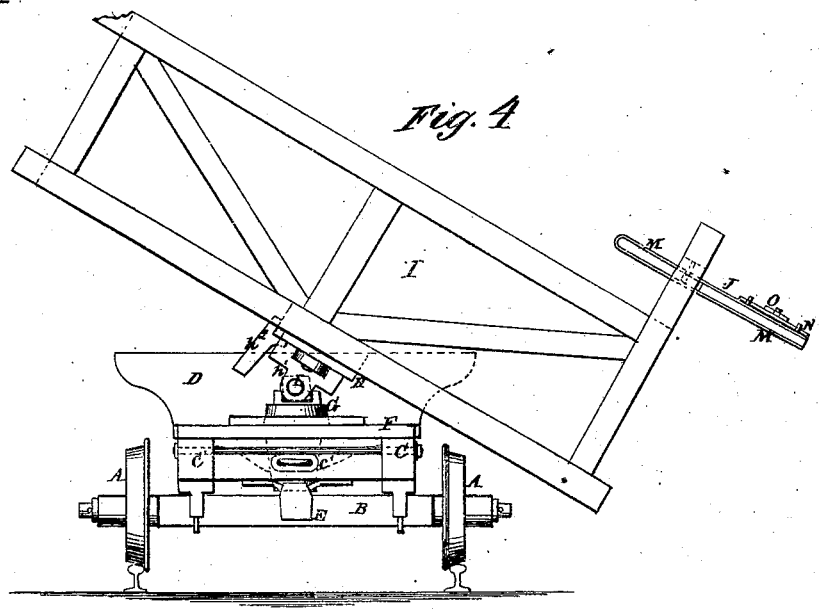
Figure 5:
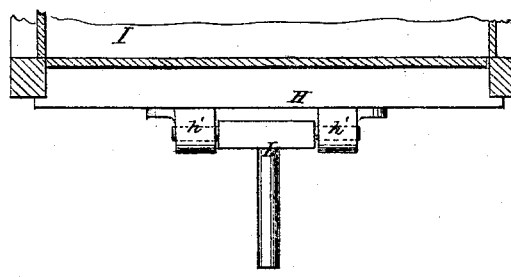
Figure 7:
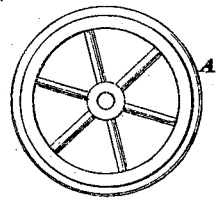
Figure 6:
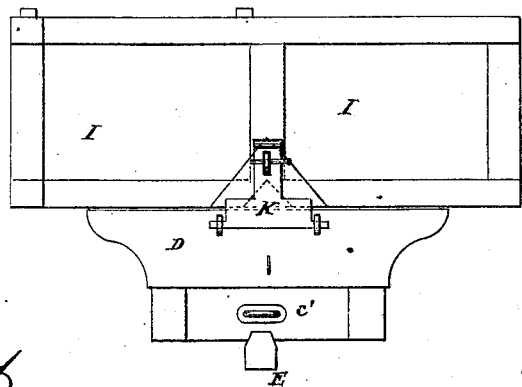

Be it known that I, ROBERT ROBERTS, of Pattenburg, in the county of Hunterdon and State of New Jersey, have invented a new and useful Improvement in Railroad Dumping-Cars, of which the following is a specification:

Figure 1, Sheet 1, is a vertical longitudinal section of my improved car, and showing in dotted lines the position of the body when dumping the load in the rear. Fig. 2, Sheet 1, is a top view of the running gearing, the body being removed. Fig. 3, Sheet 1, is a detail view of the rear end of the body. Fig. 4, Sheet 2, is a rear view of the car, the body being shown in position for dumping the load at the side. Fig. 5, Sheet 2, is a detail view of the cross-head pivoting-bolt, the body being shown in section. Fig. 6, Sheet 2, is a front end view of the same, the wheels and axles being omitted. Fig. 7, Sheet 2, is a detail side view of one of the wheels.

Similar letters of reference indicate corresponding parts.

The invention will first be fully described, and then pointed out in the claims.

A are the wheels, with the axles B of which the frame C is connected in the ordinary manner. To the forward end of the frame C is attached a block, D, upon which the forward end of the car-body rests, and to which it is secured while being filled and moved from place to place by a hasp and staple, K, or by other convenient fastening.

To the frame C, a little in the rear of its middle part, is attached a plate, F, the middle part of which is enlarged, and has a circular recess formed in it to receive the washer G. I is the body of car, to the base frame of which, a little in the rear of its center, is attached a cross-plate, H, to the under side of which, upon the opposite sides of and equally distant from its center, are attached lugs or bearings $h^1$, in which work the ends or journals formed upon the ends of the cross-head of the bolt L, which bolt passes down through a hole in the center of the washer G, and in the center of the circular recess in the plate F, and through a tubular projection formed upon the lower side of the plate F, so as to give a stable bearing to said bolt L.

The upper side of the washer G is notched transversely to receive the cross-head of the bolt L, to give it a firm bearing and enable the car-body I to be turned when it is desired to dump the load at the side of the car. $h^2$ is a guard-block attached to the forward side of the middle part of the plate H, and the lower edge of which, when the car-body I is in a horizontal position, rests upon the plate F, as shown in Fig. 1, to keep the said car-body steady while being turned. J is the tail-board of the car-body I, which is hung by U-straps M from the top cross-bar of the rear end of the car-body frame I, and the arms of which straps are attached to the opposite sides of said tail-board. The rear end posts of the car-body frame are made longer than the others, so that the cross-bar from which the tail-board J is suspended may be at such a height as to be out of the way in loading and unloading the car.

The tail-board J is secured, when closed, by a drop-bolt, N, which slides up and down in keepers attached to said tail-board, and is pivoted to a lever, O, which is pivoted to the tail-board. The other or free end of the lever O moves up and down in a keeper, and has a handle formed upon it for convenience in operating said lever, to raise the bolt N and unfasten the tail-board, when it will be pushed out of the way by the load as it slides from the car-body.

The tail-board J may be raised out of the way, for convenience in loading the car, by swinging it either inward or outward into a horizontal position, and then sliding the upper arms of the U-straps along the suspending-keepers, as shown in full lines in Fig. 4, and in dotted lines in Fig. 1.

I am aware that a car-body hinged to the centrally-located turn-table of a truck is not new; but—

What I claim is—

1. The cross-head bolt L and the notched washer G, in combination with the plate F, attached to the car-frame C, and the plate H, attached to the car-body I, substantially as shown and described.

2. The guard-block $h^2$, in combination with the plates F H, cross-head bolt L, notched washer G, frame C, and body I, substantially as shown and described.

3. The combination of the U straps M, with the tail-board J and the upper rear cross-bar of the body I, substantially as shown and described.

4. The combination of the drop-bolt N and lever O with the tail-board J of the car-body I, substantially as herein shown and described.

ROBERT ROBERTS.

Witnesses:
  T. B. MOSHER,
  ALEX. F. ROBERTS.